Patented May 24, 1927.

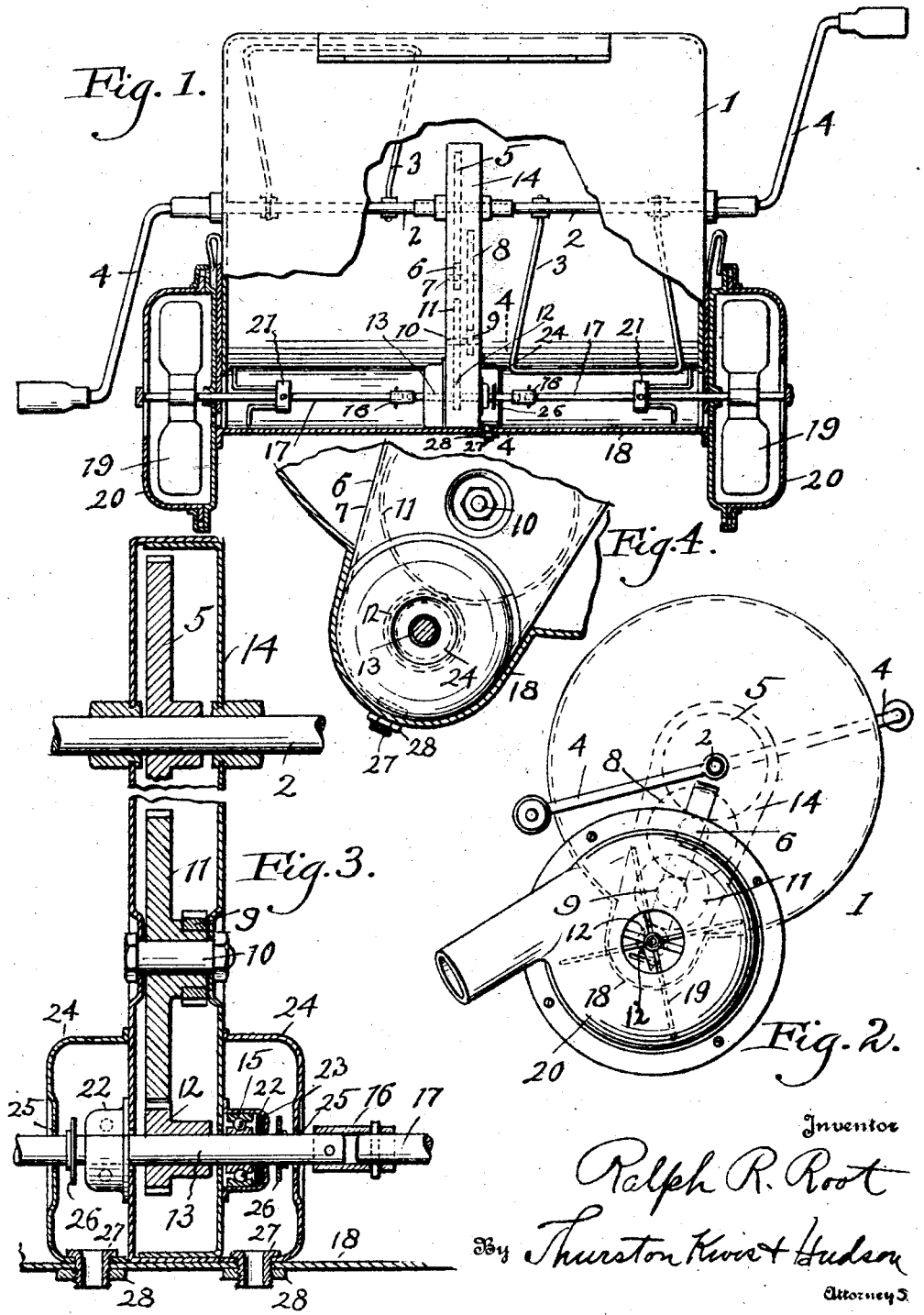

1,629,539

UNITED STATES PATENT OFFICE.

RALPH R. ROOT, OF LAKEWOOD, OHIO, ASSIGNOR TO THE ROOT MANUFACTURING COMPANY, OF CLEVELAND, OHIO, A CORPORATION OF OHIO.

PROTECTED BEARING FOR POWDER-DISPENSING DEVICES.

Application filed January 7, 1924. Serial No. 684,721.

This invention relates to protected bearings for powder dispensing devices, and has for its object to provide means for preventing entry of the powder into shaft bearings. The invention is shown herein in connection with the fan shaft bearings within the powder receptacle in a powder distributor of the type shown in my co-pending application Serial No. 590,210, filed Sept. 23, 1922.

The following description and accompanying drawings set forth in detail certain means embodying my invention, the disclosed means, however, constituting but one of the various mechanical forms in which the principle of the invention may be employed.

Reference should be had to the accompanying drawings, forming a part of this specification, in which Fig. 1 is a longitudinal section through the powder container and fan casing of a powder distributor showing the protected bearings for the fan shaft. Fig. 2 is an end view of the distributor; Fig. 3 is a central longitudinal section through the gear housing within the container which encloses the gearing through which the fan shaft is driven, showing the protecting devices for the fan shaft bearing; Fig. 4 is a fragmentary transverse section taken on line 4—4 of Fig. 1.

Referring to the accompanying drawings, the cylindrical powder container 1 has journaled therein and axially thereof a stirrer shaft 2 which carries U-shaped stirrer arms 3 within the container, and has attached thereto hand cranks 4 at opposite ends of the container.

Adjacent the center of the container the shaft 2 has fixed thereto a large gear 5 which meshes with a small gear 6 on the countershaft 7 which also carries a large gear 8 which meshes with a small gear 9 on a second countershaft 10, the countershaft 10 carrying a large gear 11 which meshes with a small gear 12 on the central section 13 of the fan shaft. The gearing above described serves to drive the fan shaft at a relatively high rate of speed from the stirrer shaft 2 and this gearing is all enclosed within a housing 14 which extends upwardly from the bottom portion of the container and is secured to the container.

The central section 13 of the fan shaft is journaled in ball bearings 15 mounted upon the opposite side walls of the gear housing 14. The central section 13 of the fan shaft is connected at its opposite ends by means of flexible coupling 16 to the end section 17 of the fan shaft, the fan shaft being mounted adjacent the bottom of the container within a delivery trough 18 and extending through the end walls of the container. Outside the container end sections 17 of the fan shaft carry fans 19 enclosed within fan casings 20 mounted upon the end walls of the container.

Adjacent the opposite ends of the delivery trough 18 the fan shaft carries the agitating and feeding devices 21 which serve to deliver the powdered material into the fan casings and which are described and claimed in my co-pending application Serial No. 684,722, filed of even date herewith.

Each bearing 15 is mounted within a casing 22 which is rigidly secured to a side wall of the housing 14. The casings 22 are cup-shaped and support outside the bearings 15 washers 23 of suitable packing material which bear against the shaft 13. The bearing casings 22 are enclosed within outer cup-shaped casings 24 which are of considerably larger diameter and fit within the trough 18. The outer walls of the casings 24 are spaced outwardly from the casings 22, and are provided with openings 25 of slightly greater diameter than the central shaft section 13 through which the shaft section extends. Within each of the casings 24 and between the opening 25 and the bearing casing 22 there is fixed to the shaft a disk 26 which serves as a baffle to deflect downwardly any powder which enters the casing 24 through the opening 25. This baffle serves to prevent passage of the powder along the shaft to the bearing casing 22 and prevents entry of powder to the bearing. In order to avoid accumulations of powder within the casings 24, each of the casings is provided with a discharge opening through the bottom wall of the container which is formed by a tubular bolt 27 which has a flange forming a head at its upper end engaging the peripheral wall of the casing 24 at the bottom thereof, and a stem portion extending through the bottom of the housing 24 and the bottom of the trough 18. The tubular bolt 27 has external screw threads and is engaged by a nut 28 on the under side of the trough 18. The bolts 27 thus serve both to clamp the casings 24 to the wall of the container, and also to provide discharge openings through which any powder that enters the casing 24 through the opening 25 is discharged by gravity from the casing so that powder will not accumulate in the outer casings 24 around the bearing housing.

Having described my invention, I claim:

1. The combination with a container for powdered material, of a shaft extending into the container, a bearing for the shaft, a casing forming a chamber in which the bearing is enclosed, said casing having an opening through which the shaft extends, said opening communicating with the interior of the container, and a baffle surrounding the shaft within the casing and between the said opening and said bearing.

2. The combination with a container for powdered material, of a shaft extending into the container, a bearing for the shaft, a casing forming a chamber in which the bearing is enclosed, said casing having an opening communicating with the interior of the container through which the shaft extends, deflecting means within the casing for preventing passage of powder from the opening to the bearing, and means for preventing accumulation of powder within the casing.

3. The combination with a container for powdered material, of a shaft extending into the container, a bearing for the shaft within the container, a casing forming a chamber enclosing the bearing, said casing having an opening into the container through which the shaft extends, and a disk secured to the shaft within the casing and between the bearing and opening.

4. The combination with a container for powdered material having a shaft extending into the same, gearing within the container for driving the shaft and a gear case enclosing the gearing, of a bearing for the shaft mounted in the wall of the gear case, a casing secured to said wall of the gear case and forming a chamber enclosing the bearing, said casing having an opening through which the shaft extends, a disk carried by the shaft within the casing between the opening and bearing, and means for preventing accumulation of powder within the casing.

5. The combination with a container for powdered material, of a shaft extending into the container, a bearing for said shaft, and a casing forming a chamber enclosing the bearing, said casing having a wall spaced from the bearing said wall having an opening into the interior of the container through which the shaft extends and said casing having an opening in the bottom thereof through which powder entering the casing through said openings may be discharged by gravity.

6. The combination with a container for powdered material having a shaft extending through the same, gearing within the container for driving the shaft and a gear case enclosing the gearing, of ball bearings for the shaft carried by opposite side walls of the gear case, casings fitting over the outer portions of the bearings, packing rings carried by the casings and engaging the shaft outside the bearings, outer casing members secured to the side walls of the gear case and spaced radially and axially from the first mentioned casing, said outer casing members having openings through which the shaft extends, means for deflecting powder entering the outer casing through said openings, and means for preventing powder from accumulating in said outer casing.

In testimony whereof, I hereunto affix my signature.

RALPH R. ROOT.